J. B. ROOT.
ROTARY VALVE.
No. 65,013. Patented May 21, 1867.
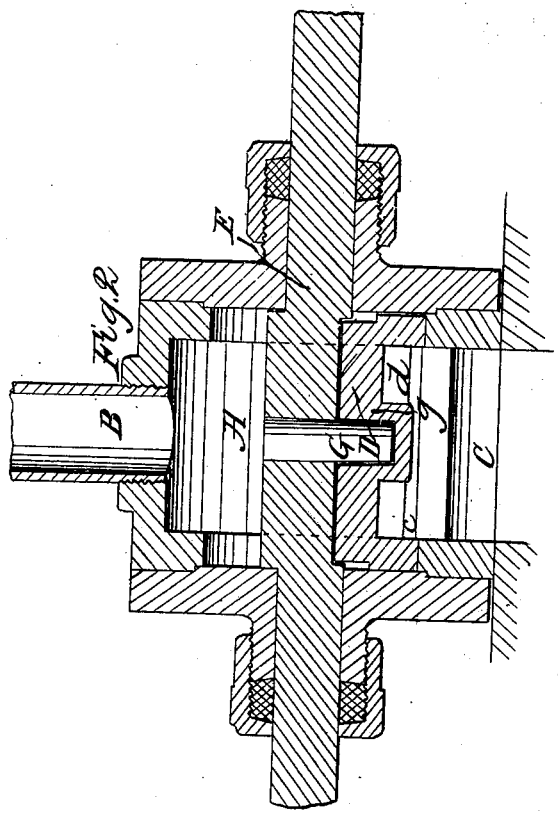
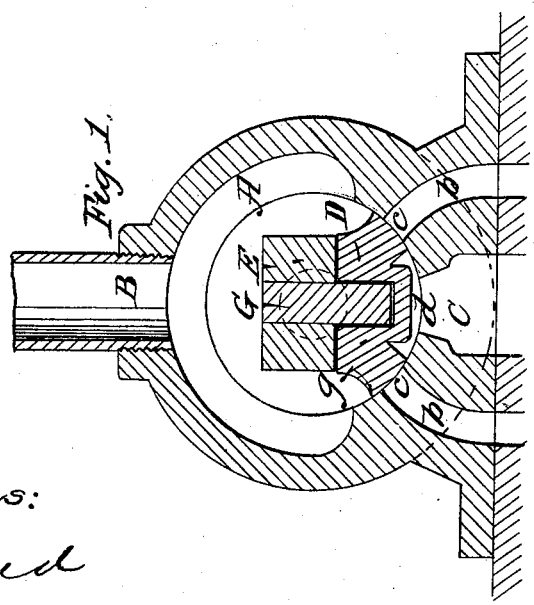
Witnesses:
G. W. Reed
A. Lellere
Inventor.
John B. Root

United States Patent Office.

JOHN B. ROOT, OF NEW YORK, N. Y.

Letters Patent No. 65,013, dated May 21, 1867.

---

IMPROVEMENT IN ROTARY VALVES.

---

The Schedule referred to in these Letters Patent and making part of the same.

---

TO ALL WHOM IT MAY CONCERN:

Be it known that I, JOHN B. ROOT, of the city, county, and State of New York, have invented a certain new and useful Improvement in Driving or Operating-Valves for Steam Engines and other purposes, of which the following is a full, clear, and exact description, reference being had to the accompanying drawing, which forms part of this specification, and in which—

Figures 1 and 2 represent sectional views at right angles to each other of a valve having my improvement applied thereto.

Like letters indicate like parts throughout both figures.

My improvement has reference to valves, the faces of which move in the arcs of circles, and the nature of the invention consists in operating the valve by means of a pin projecting radially from a rock-shaft, and formed cylindrical at its junction with the valve, into which it is made to fit loosely, by which mode of hanging or driving and operating the valve is given free play in varied directions to turn and work on said pin or driver to compensate for wear, and adjust itself from time to time to steam-tight contact with its seat, regardless of the equal or unequal wear in its bearings of the rock-shaft or spring of the latter by the action of the eccentric or other device which drives it. In this description it will suffice to refer to the valve to which my improvement is shown applied as controlling the induction and eduction ports of a steam engine, but it of course is equally applicable to working other fluids.

Referring to the accompanying drawing, A represents the valve-chamber, and $a$ its seat. B, the steam inlet, and $b$ the ports or passages to the engine cylinder. C is the exhaust passage. The valve D, which may be either of cylindrical or conical character on its face or faces $c$, is provided with the usual exhaust cavity $d$, and serves, by giving to it a vibratory or rocking motion, alternately to admit and exhaust steam to and from the ports $b$. This vibratory motion is effected by a rock-shaft, E, which may be driven by an eccentric in the usual way, but the connection of said shaft with the valve essentially differs from previous driving actions to valves the faces of which move in the arcs of circles. Thus, the valve D is operated by the rock-shaft E through a pin or driver, G, projecting radially from the rock-shaft, and formed cylindrical at its junction with the valve, into a cavity, $g$, in which it freely or loosely fits, thereby not only allowing of the valve to adjust itself to its seat relatively to its distance from the rock-shaft, but to accommodate or adjust itself in various directions, including more particularly, by its freedom to turn on the pin or driver G, which in this respect importantly differs from a mere toe-driver, to an independent valve as regards its self-adaptability to its seat in case of the rock-shaft being sprung out of line by the alternate push and pull of the eccentric on it, as is sometimes the case, and which, where the valve is not thus independently hung with freedom to turn on its driver, or its driver on it, draws the valve out of line with its seat and occasions leakage. While, however, this and a general adaptability of the valve to its seat is effected by the loose connection of the valve with its cylindrical driver, which secures to it a steam-tight contact irrespective of the unequal wear or twist of the rock-shaft, a steady and positive driving action is obtained for the valve.

What I claim as my invention, and desire to secure by Letters Patent, is—

The combination, with a valve, the face of which moves in the arc of a circle or arcs of circles, of a driving-pin, G, projecting radially from the valve-operating rock-shaft, and made cylindrical at its junction with the valve, and to loosely fit or enter a cavity in the valve, substantially as and for the purpose or purposes herein set forth.

JOHN B. ROOT.

Witnesses:
   A. LE CLERC,
   G. W. REED.